(12) United States Patent
Kim (10) Patent No.: US 9,667,823 B2
(45) Date of Patent: May 30, 2017

(54) TIME-VARYING BARCODE IN AN ACTIVE DISPLAY

(71) Applicant: Moon J. Kim, Wappingers Falls, NY (US)

(72) Inventor: Moon J. Kim, Wappingers Falls, NY (US)

(*) Notice: Subject to any disclaimer, the term of this patent is extended or adjusted under 35 U.S.C. 154(b) by 204 days.

(21) Appl. No.: 13/661,443

(22) Filed: Oct. 26, 2012

(65) Prior Publication Data

US 2014/0117074 A1 May 1, 2014
US 2016/0301821 A9 Oct. 13, 2016

Related U.S. Application Data

(63) Continuation of application No. 13/556,831, filed on Jul. 24, 2012, now Pat. No. 8,408,462, which is a continuation of application No. 13/106,514, filed on May 12, 2011, now Pat. No. 8,256,673.

(51) Int. Cl.
| | |
|---|---|
| *H04N 1/047* | (2006.01) |
| *G06K 7/10* | (2006.01) |
| *H04B 10/116* | (2013.01) |
| *G06K 7/14* | (2006.01) |
| *G06K 19/06* | (2006.01) |
| *H04N 1/028* | (2006.01) |

(52) U.S. Cl.
CPC .......... *H04N 1/047* (2013.01); *G06K 7/1095* (2013.01); *G06K 7/10722* (2013.01); *G06K 7/1447* (2013.01); *G06K 19/06028* (2013.01); *G06K 19/06075* (2013.01); *G06K 19/06112* (2013.01); *H04B 10/116* (2013.01); *H04N 1/028* (2013.01)

(58) Field of Classification Search
USPC .......................................................... 235/375
See application file for complete search history.

(56) References Cited

U.S. PATENT DOCUMENTS

| | | | |
|---|---|---|---|
| 5,073,954 | A | 12/1991 | Van Tyne et al. |
| 5,278,397 | A | 1/1994 | Barkan et al. |
| 5,591,952 | A | 1/1997 | Krichever et al. |
| 7,089,420 | B1 | 8/2006 | Durst et al. |
| 7,162,035 | B1 | 1/2007 | Durst et al. |
| 7,273,180 | B2 | 9/2007 | Zhu et al. |

(Continued)

OTHER PUBLICATIONS

U.S. Appl. No. 13/106,514, Office Action dated Oct. 7, 2011, 12 pages.

(Continued)

*Primary Examiner* — Michael G Lee
*Assistant Examiner* — David Tardif
(74) *Attorney, Agent, or Firm* — Madeline F. Schiesser; Keohane & D'Alessandro PLLC (57) ABSTRACT

Embodiments of the present invention provide time-varying barcodes in an active display for information exchange. Specifically, embodiments of the present invention provide a system and method for communicating information between electronic devices via a barcode image sequence. In a typical embodiment, a barcode image sequence is displayed on the display screen of a first electronic device. A second electronic device reads and decodes the barcode image sequence. The second electronic device displays an acknowledgement on the display screen of the second electronic device. The acknowledgement is read by the first electronic device.

10 Claims, 6 Drawing Sheets

(56) References Cited

U.S. PATENT DOCUMENTS

| | | | |
|---|---|---|---|
| 7,360,706 B2 | 4/2008 | Zhu et al. | |
| 7,578,436 B1 | 8/2009 | Kiliccote | |
| 7,946,493 B2 | 5/2011 | Havens et al. | |
| 8,231,054 B1 | 7/2012 | Kim | |
| 8,256,673 B1 | 9/2012 | Kim | |
| 8,408,462 B2 | 4/2013 | Kim | |
| 8,418,922 B1 | 4/2013 | Kim | |
| 2002/0067865 A1 | 6/2002 | Stutzman | |
| 2002/0099942 A1 | 7/2002 | Gohl | |
| 2005/0005102 A1 | 1/2005 | Meggitt et al. | |
| 2005/0038756 A1 | 2/2005 | Nagel | |
| 2005/0199699 A1 | 9/2005 | Sato et al. | |
| 2005/0246536 A1 | 11/2005 | Roberts | |
| 2006/0002610 A1 | 1/2006 | Suomela et al. | |
| 2006/0052058 A1 | 3/2006 | Lai et al. | |
| 2006/0054695 A1 | 3/2006 | Owada | |
| 2006/0071077 A1 | 4/2006 | Suomela et al. | |
| 2006/0101280 A1 | 5/2006 | Sakai | |
| 2007/0019616 A1 | 1/2007 | Rantapuska et al. | |
| 2007/0021065 A1 | 1/2007 | Sengupta et al. | |
| 2007/0109262 A1 | 5/2007 | Oshima et al. | |
| 2007/0187509 A1 | 8/2007 | Kotlarsky et al. | |
| 2007/0199993 A1 | 8/2007 | Kotlarsky et al. | |
| 2007/0211148 A1* | 9/2007 | Lev | H04N 1/00331 348/207.99 |
| 2007/0242883 A1 | 10/2007 | Kruppa | |
| 2008/0099561 A1 | 5/2008 | Douma | |
| 2008/0203167 A1 | 8/2008 | Soule et al. | |
| 2008/0230615 A1 | 9/2008 | Read et al. | |
| 2008/0244714 A1 | 10/2008 | Kulakowski et al. | |
| 2008/0277475 A1 | 11/2008 | Kotlarsky et al. | |
| 2009/0176505 A1* | 7/2009 | Van Deventer | G06F 1/1626 455/456.1 |
| 2009/0308927 A1 | 12/2009 | Longacre et al. | |
| 2010/0020970 A1 | 1/2010 | Liu et al. | |
| 2010/0030695 A1 | 2/2010 | Chen et al. | |
| 2010/0112279 A1 | 5/2010 | McIntosh | |
| 2010/0125497 A1 | 5/2010 | Arguello | |
| 2010/0210287 A1* | 8/2010 | De Vries | H04L 63/0492 455/456.3 |
| 2011/0000958 A1 | 1/2011 | Herzig | |
| 2011/0070829 A1 | 3/2011 | Griffin et al. | |
| 2011/0081860 A1 | 4/2011 | Brown et al. | |
| 2012/0045059 A1* | 2/2012 | Fujinami | H04L 9/0866 380/273 |
| 2012/0077433 A1 | 3/2012 | Walker et al. | |
| 2012/0141660 A1 | 6/2012 | Fiedler | |
| 2012/0198531 A1 | 8/2012 | Ort et al. | |
| 2012/0264401 A1 | 10/2012 | Hwang | |
| 2012/0292392 A1 | 11/2012 | Kim | |
| 2012/0298752 A1 | 11/2012 | Kim | |
| 2013/0031261 A1* | 1/2013 | Suggs | H04L 63/083 709/228 |
| 2013/0221083 A1 | 8/2013 | Doss et al. | |
| 2013/0240621 A1* | 9/2013 | Everett | G06Q 40/02 235/379 |
| 2014/0004793 A1 | 1/2014 | Bandyopadhyay et al. | |
| 2014/0113550 A1 | 4/2014 | Li | |
| 2014/0117074 A1 | 5/2014 | Kim | |
| 2014/0330993 A1 | 11/2014 | Raz | |
| 2014/0334665 A1 | 11/2014 | Quinn et al. | |
| 2015/0138608 A1 | 5/2015 | Turner et al. | |
| 2016/0267369 A1 | 9/2016 | Picard et al. | |

OTHER PUBLICATIONS

U.S. Appl. No. 13/106,514, Notice of Allowance dated Feb. 3, 2012, 8 pages.
U.S. Appl. No. 13/556,831, Office Action dated Aug. 29, 2012, 14 pages.
U.S. Appl. No. 13/556,831, Notice of Allowance dated Jan. 9, 2013, 14 pages.
Trail, U.S. Appl. No. 13/556,831, Notice of Allowance, Jan. 9, 2013, 14 pages.
Sandford, U.S. Appl. No. 14/798,787, Office Action, Sep. 29, 2016, 23 pages.
Sandford, U.S. Appl. No. 13/412,792, Office Action, Feb. 25, 2014, 43 pages.
Sandford, U.S. Appl. No. 13/412,792, Final Office Action, Sep. 5, 2014, 28 pages.
Sandford, U.S. Appl. No. 13/412,792, Office Action, Dec. 3, 2014, 38 pages.
Sandford, U.S. Appl. No. 13/412,792, Notice of Allowance, May 15, 2015, 10 pages.
Trail, U.S. Appl. No. 13/106,514, Notice of Allowance, Feb. 3, 2012, 8 pages.
Trail, U.S. Appl. No. 13/556,831, Office Action, Aug. 29, 2012, 14 pages.
Sandford, U.S. Appl. No. 14/798,787, Notice of Allowance, Dec. 6, 2016, 13 pages.
Trail. U.S. Appl. No. 13/113,205, Office Action, Oct. 7, 2011, 12 pages.
Trail. U.S. Appl. No. 13/113,205, Notice of Allowance, Mar. 30, 2012, 8 pages.
Trail. U.S. Appl. No. 13/556,737, Office Action, Aug. 29, 2012, 13 pages.
Trail. U.S. Appl. No. 13/556,737, Notice of Allowance, Jun. 20, 2013, 19 pages.
Trail. U.S. Appl. No. 16/626,119, Office Action, Nov. 7, 2012, 8 pages.
Trail, U.S. Appl. No. 13/626,119, Notice of Allowance, Mar. 11, 2013, 15 pages.

* cited by examiner

TIME-VARYING BARCODE IN AN ACTIVE DISPLAY

CROSS-REFERENCE TO RELATED APPLICATIONS

This application is a continuation of commonly-owned and co-pending application Ser. No. 13/556,831, filed Jul. 24, 2012. The earlier filed application is itself a continuation application of commonly-owned application Ser. No. 13/106,514, filed on May 12, 2011 (now U.S. Pat. No. 8,256,673, issued Sep. 4, 2012).

FIELD OF THE INVENTION

In general, the present invention relates to barcodes. Specifically, the present invention relates to time-varying barcodes in an active display for information exchange.

BACKGROUND OF THE INVENTION

A barcode is a static, optical machine-readable representation (image) of data. The bars are read by variances in reflected light. Barcode readers are relatively inexpensive and more accurate than key entry. However, issues arise when the barcode image is low resolution or has become obstructed or damaged in some way, causing a failed read or misread of the barcode information. Barcodes are also susceptible to limitations of the printer and reader. For example, barcodes printed on dark backgrounds like corrugated cardboard may be difficult to read. Heretofore, several unsuccessful attempts have been made to address these shortcomings.

U.S. Patent Application 20110000958 discloses a method and system for communicating encoded information through "animated" barcodes wherein a single bar code area on an electronics' display or television is scanned multiple times while the bar code area changes from one bar code image to another.

U.S. Patent Application 20100020970 discloses a system and method for creating a camera imaging data channel by encoding a sequence of bar codes from a display screen and captured by a camera, then decoded by software on a cell phone or similar device.

U.S. Patent Application 20060054695 discloses a dynamic bar code display apparatus that includes a storage medium and means for displaying at least two or more bar codes continuously.

U.S. Pat. No. 7,360,706 and U.S. Pat. No. 7,273,180 disclose a hand-supportable digital imaged-based bar code symbol reading device.

U.S. Pat. No. 5,591,952 discloses a bar code reader that utilizes a CCD imager device to capture the image and the memory data from the imager device is analyzed to recognize and decode any symbols included within the image.

U.S. Pat. No. 5,278,397 discloses a multi-resolution bar code reader in which the bar code reader's optics and sensing elements are organized to send two channels of data derived from a bar code scan.

U.S. Pat. No. 5,073,954 discloses the bar code location and recognition processing system in which a bar code is optically scanned and a digital video processor converts the scan to binary data and determines the location and pattern of the bar code in the scan image.

U.S. Patent Application 20080277475 discloses a digital image capture and processing system that combines video and snapshot image captures into a single bar code data capture cycle.

U.S. Patent Application 20070199993 and U.S. Patent Application 20070187509 disclose a hand-supportable digital bar code reader that has multiple modes of image processing capabilities that include reading both 1D and 2D bar code symbols.

None of these references, however, teach the use of an error-identifying or two-way communication feed-back loop in a dual electronic device apparatus that uses image display and image capturing devices to communicate between the devices via bar codes in at least one direction. Furthermore, none of these references teach the use of bar codes that have varying sections of bar code image pattern resolution within a single bar code pattern.

SUMMARY OF THE INVENTION

In general, embodiments of the present invention provide time-varying barcodes in an active display for information exchange. Specifically, embodiments of the present invention provide a system and method for communicating information between electronic devices via a barcode image sequence. In a typical embodiment, a barcode image sequence is displayed on the display screen of a first electronic device. A second electronic device reads and decodes the barcode image sequence. The second electronic device displays an acknowledgement on the display screen of the second electronic device. The acknowledgement is read by the first electronic device.

A first aspect of the present invention provides a data communication system for communicating information between electronic devices via a barcode image sequence, said system comprising: a first electronic device, comprising: a display screen; a display component configured to display a barcode image sequence on the display screen of the first electronic device; a second electronic device, comprising: a display screen; a camera configured to read the barcode image sequence; a barcode decoding component configured to decode the barcode image sequence; and a display component configured to display an acknowledgement on the display screen of the second electronic device.

A second aspect of the present invention provides a data communication device for communicating information via an image, said device comprising: a camera configured to capture a set of images provided by a display of another data communication device; an analysis component configured to analyze first set of images; and a response generation component configured to generate a response to the analyzed set of images, and the response being processed by the other communication device to determine an alignment of the data communication device with the other data communication device.

A third aspect of the present invention provides a method for determining an alignment of electronic devices, comprising: capturing, with a camera of a first electronic device, a first set of images displayed on a display of second electronic device; processing the first set of images on the first electronic device; generating a graphical response to the processed first set of images; and providing the graphical response to the second electronic device.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or rectify "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, a camera includes any electronic device or component configured to capture and provide signals and/or data representative of video images. Video images include, but are not limited to, barcode images.

The barcode can be traced back to 1948, but it did not have a large impact until the 1970's when it became a tool in alleviating manual inventories. Grocery store owners began to see it as a way to save time and money in tracking product levels within the store. Throughout the 1970's, barcode scanning systems became more affordable and practical with the continued price reduction and miniaturization of barcode readers.

However, the barcode reader usually needs a fairly good picture of the symbol to decode these barcodes. Barcodes can store a large amount of data, but grow in size and complexity relative to the amount of data stored. The bigger and more complex the barcode, the better the picture required to decode it.

As indicated above, embodiments of the present invention provide a system and method for communicating information between electronic devices via a barcode image sequence. In a typical embodiment, a barcode image sequence is displayed on the display screen of a first electronic device. A second electronic device reads and decodes the barcode image sequence. The second electronic device displays an acknowledgement on the display screen of the second electronic device. The acknowledgement is read by the first electronic device.

Figure 1:
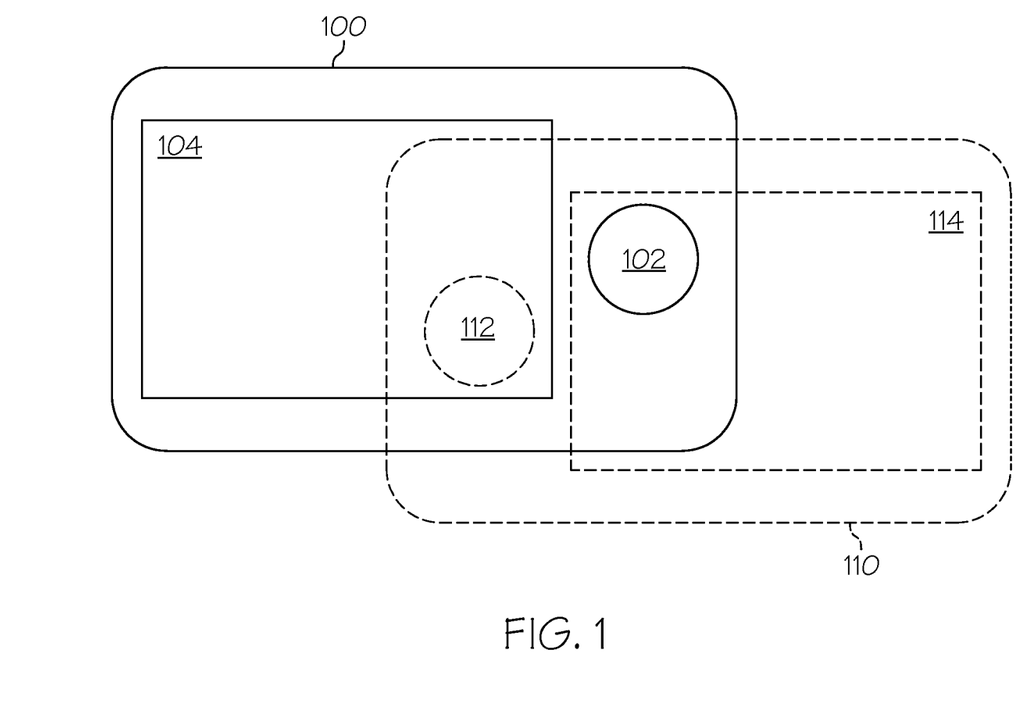
FIG. 1 depicts dual electronic devices having image display and image capturing components according to an embodiment of the present invention.

Referring now to FIG. 1, dual electronic devices having image display and image capturing components according to an embodiment of the present invention are depicted. Barcode terminal 1 (T1) 100 includes camera 1 (C1) 102 and display screen 1 (S1) 104. Barcode terminal 2 (T2) 110 includes camera 2 (C2) 112 and display screen 2 (S2) 114. T1 100 and T2 110 are facing each other. S1 104 covers C2 112 and S2 114 covers C1 102. T1 100 and T2 110 each use image display and image capturing capabilities which enable two-way communication. For simplicity, hereinafter, Barcode Terminal 1 100 is referred to as T1 and Barcode Terminal 2 110 is referred to as T2.

Figure 2A:
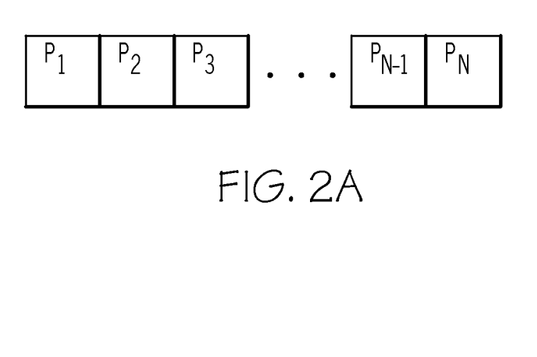
FIG. 2A depicts intended data divided into packets according to an embodiment of the present invention.

FIG. 2A depicts intended data divided into packets according to an embodiment of the present invention. The data to be communicated/transmitted is divided into packets. The size of each packet is dependent upon several factors including, but not limited to, display screen resolution, barcode image size, and data communication channel quality (i.e., the quality of the display screen and camera).

Figure 2B:
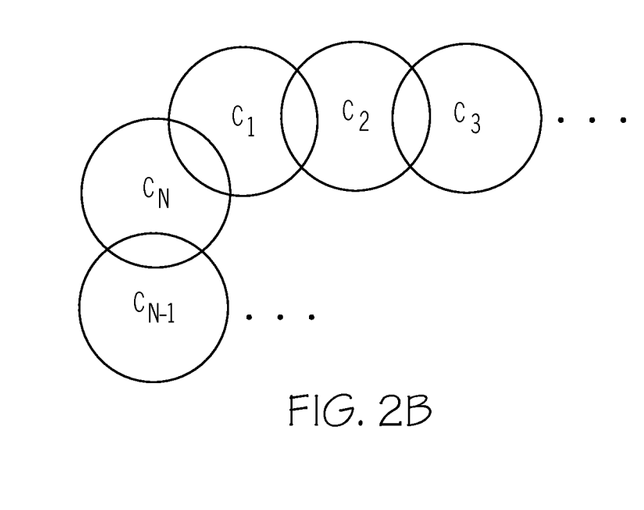
FIG. 2B depicts error correcting code information according to an embodiment of the present invention.

FIG. 2B depicts error correcting code information according to an embodiment of the present invention. Each packet has redundancy to the previous and next packet (when applicable). This means that each packet will include information from the previous and next packet (when applicable). If a packet is lost, then the missing information may be reconstructed at the receiver from the error correcting code data contained in the other packet(s), provided that the average number of consecutively lost packets is small.

Each data packet is coded as a barcode image with additional error-correcting code. For example, T1 displays an image on its display screen. The camera on T2 reads the image. Any errors that are introduced are detected and corrected based on the remaining codes. The display screen of T2 displays a check sum which is read by the camera of T1. T1 verifies the transmission results. If error increases, the image resolution may be decreased or the cameras need to be realigned.

Figure 3:
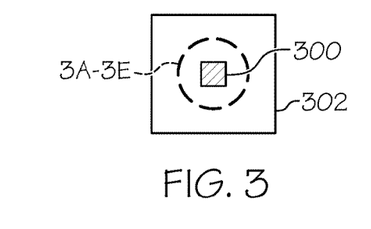
FIG. 3 depicts a camera resolution checkup sequence according to an embodiment of the present invention.
Figure 3A:
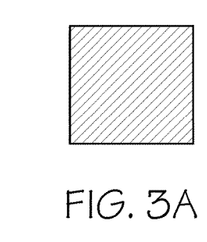
Figure 3B:
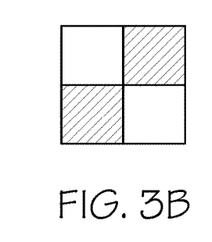
Figure 3C:
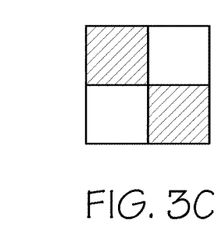
Figure 3D:
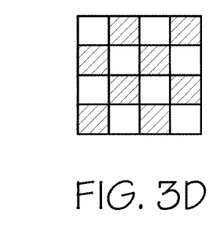
Figure 3E:
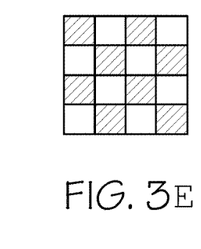
Figure 4A:
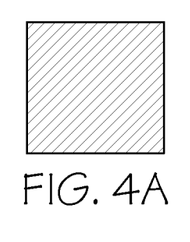
FIG. 4 depicts a camera detection location sequence according to an embodiment of the present invention.
Figure 4B:
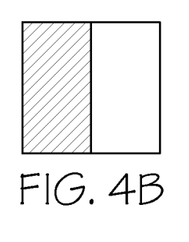
Figure 4C:
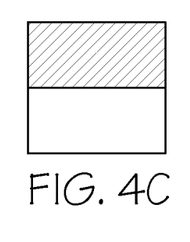
Figure 4D:
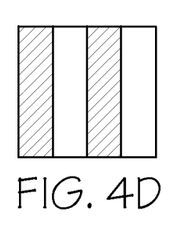
Figure 4E:
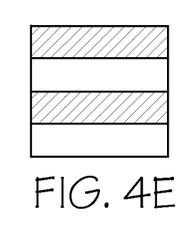

FIG. 3 depicts a camera resolution checkup sequence according to an embodiment of the present invention. The resolution calibration is used to determine the resolution capability of a camera. T1 displays a sequence of images on its display screen. T1 displays the images beginning from the simplest image to the most complex image in increasing complexity. The camera on T2 reads each image as they are displayed and responds through its display screen with a spatial and temporal code. T1 determines the resolution capability of the camera of T2 based on the codes read from the display screen of T2.

A similar camera resolution checkup sequence is also ran to determine the resolution capability of the camera on T1. T2 displays a sequence of images on its display screen. T2 displays the images beginning from the simplest image to the most complex image in increasing complexity. The camera on T1 reads each image as they are displayed and responds through its display screen with a spatial and temporal code. T2 determines the resolution capability of the camera on T1 based on the codes read from the display screen of T1.

FIG. 4 depicts a camera detection location sequence according to an embodiment of the present invention. Each barcode terminal must perform an alignment detection algorithm to determine the camera location of the other barcode terminal on its own screen. To accomplish this task, T1 displays an image or multiple images on its screen. The camera of T2 reads part of the display screen of T1 and generates a whole screen response on the display screen of T2. T1 reads the response from the display of T2 to determine the camera location of T2 on the screen of T1.

T2 repeats the process to determine the camera location of T1 on the screen of T2. T2 displays an image or multiple images on its screen. The camera of T1 reads part of the display screen of T2 and generates a whole screen response on the display screen of T1. T2 reads the response from the display of T1 to determine the camera location of T1 on the screen of T2.

Figure 5A:
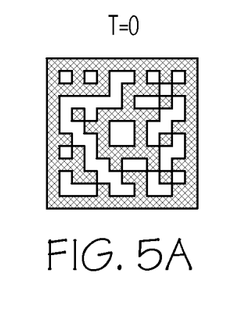
FIG. 5 depicts time-varying barcodes that are sequentially displayed according to an embodiment of the present invention.
Figure 5B:
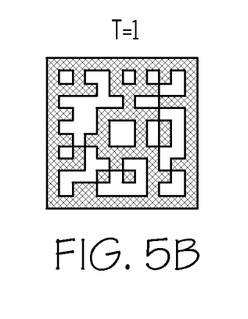
Figure 5C:
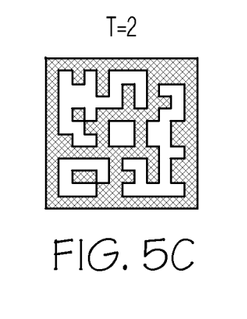

FIG. 5 depicts time-varying codes that are sequentially displayed according to an embodiment of the present invention. The images within the barcode sequence do not have to have the same specifications (e.g., resolution, size, etc.). Each image in the sequence may have its own set of characteristics. For example, information to be communicated may be divided into three packets. Since each packet has less data, the images generated from the packets will be less complex (and thus, easier to read) than an image generated from the whole message. An image generated from the whole message would be complex and require a higher resolution. Since each packet contains only part of the whole information, the images generated from each packet may be readable by a lower resolution reader. Also, image code display periods do not have to be constant. More time may be given to more complex codes and less time for simpler codes.

Figure 6:
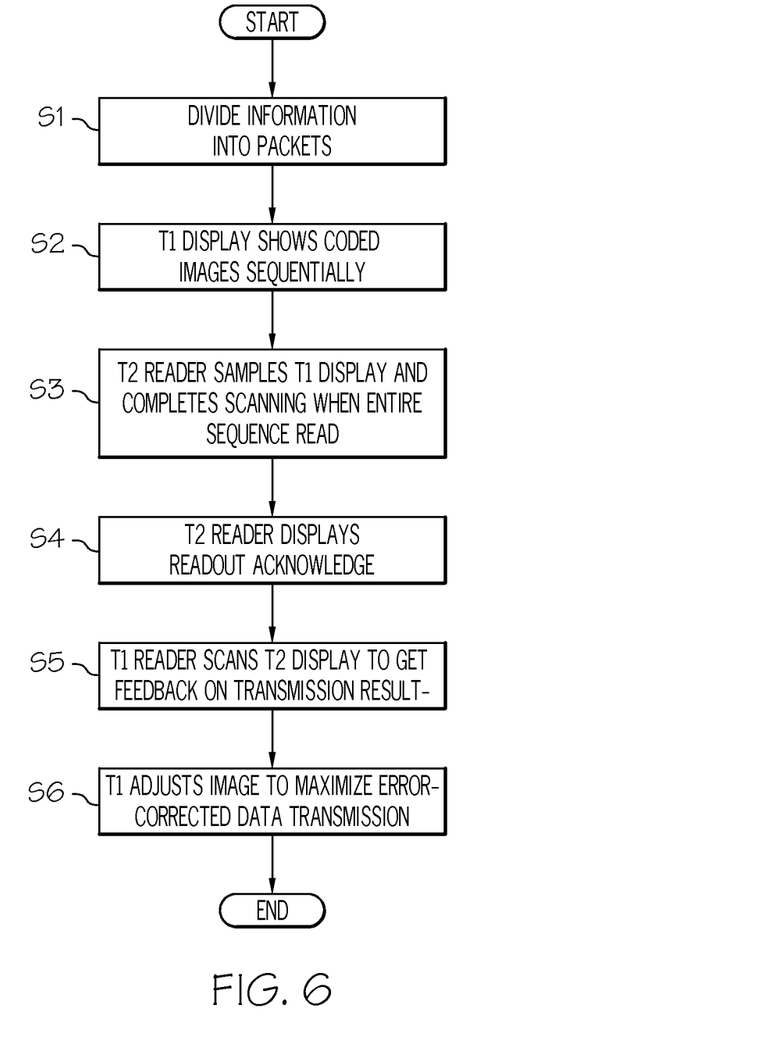
FIG. 6 depicts a process flow diagram according to an embodiment of the present invention.

FIG. 6 depicts a process flow diagram according to an embodiment of the present invention. Whole information is divided by a group of packets (step S1). Each packet has redundancy to previous and next packet. Each data packet is coded as an image with additional error-correcting code. The first barcode terminal (T1) display shows coded images sequentially (step S2). The second barcode terminal (T2) reader periodically samples display and completes scanning when whole sequence is read and decoded (step S3). T2 reader displays readout acknowledgement to reader screen (step S4). T1 reader scans T2 display to get feedback on transmission result (step S5). T1 adjusts image code characteristics (e.g., resolution, size, location) dynamically to maximize error-corrected data transmission (step S6).

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A data communication device for communicating information via an image, said device comprising:
    a camera configured to capture a set of images provided by a display of another data communication device;
    an analysis component configured to analyze a first set of images, wherein each image of the set of images comprises information redundant to another image and wherein each image is a data packet comprising a portion of data differing from an immediately previous data packet; and
    a response generation component configured to generate a response to the analyzed set of images, the response comprising a verification of the first set of images and the response being configured for having an alignment detection algorithm performed based on the response by the other communication device to align the display of the other data communication device with the camera of the data communication device.

2. The data communication device of claim 1, the response comprising a graphical response displayed on a display of the data communication device.

3. The data communication device of claim 1, the response being captured by a camera of the other communication device.

4. The data communication device of claim 3, the response being processed by the other communication device to determine a level of alignment of the data communication device with the other data communication device.

5. The data communication device of claim 1, the data communication device comprising a first mobile device, and the other data communication device comprising a second mobile device.

6. A method for determining an alignment of electronic devices, comprising:
    capturing, with a camera of a first electronic device, a first set of images displayed on a display of second electronic device, wherein each image of the set of images is a data packet comprising a portion of data differing from an immediately previous data packet and each image of the set of images comprises information redundant to another image;
    processing the first set of images on the first electronic device;
    generating a graphical response to the processed first set of images, the graphical response comprising a verification of the first set of images and being configured for having an alignment detection algorithm performed based on the graphical response by the second electronic device to align the display of the second electronic device with the camera of the first electronic device; and
    providing the graphical response to the second electronic device for the performance of the alignment detection algorithm.

7. The method of claim 6, the providing comprising displaying the graphical response on a display of the first electronic device.

8. The method of claim 7, the providing further comprising capturing the graphical response with a camera of the second electronic device.

9. The method of claim 6, further comprising processing the graphical response on the second electronic device to determine an alignment of the first electronic device with the second electronic device.

10. The method of claim 6, the first electronic device comprising a first mobile device, and the second electronic device comprising a second mobile device.

* * * * *